United States Patent [19]
Riddle

[11] Patent Number: 5,983,261
[45] Date of Patent: Nov. 9, 1999

[54] METHOD AND APPARATUS FOR ALLOCATING BANDWIDTH IN TELECONFERENCING APPLICATIONS USING BANDWIDTH CONTROL

[75] Inventor: Guy G. Riddle, Los Gatos, Calif.

[73] Assignee: Apple Computer, Inc., Cupertino, Calif.

[21] Appl. No.: 08/674,137

[22] Filed: Jul. 1, 1996

[51] Int. Cl.$^6$ .................................................. G06F 13/00
[52] U.S. Cl. ......................................... 709/204; 709/226
[58] Field of Search ........................ 395/200.53, 200.56, 395/200.58, 200.62, 200.63, 200.65, 200.68, 200.5, 200.51, 200.52, 200.54, 200.55, 200.34; 370/229, 260, 468; 709/205, 224, 226, 204

[56] References Cited

U.S. PATENT DOCUMENTS

| | | | |
|---|---|---|---|
| 5,600,797 | 2/1997 | Marshall | 709/224 |
| 5,604,742 | 2/1997 | Colmant et al. | 370/396 |
| 5,673,393 | 9/1997 | Marshall et al. | 395/200.04 |

*Primary Examiner*—Moustafa M. Meky
*Attorney, Agent, or Firm*—Blakely, Sokoloff, Taylor & Zafman

[57] ABSTRACT

In the present invention, in some embodiments, an administrator assigns a total bandwidth allocation to at least one other computer system, and the computer system parcels the bandwidth among the applications running on the computer system. In the operation of one embodiment of the present invention, an administrator sends a bandwidth maximum allocation to each node on the system. Each node determines a current bandwidth being used, and limits the current bandwidth to this allocation. Thereafter, each node then reallocates its usable bandwidth among applications running on the nodes that are attempting to send messages over the network. For each application, a current bandwidth use is determined, as well as a current bandwidth demand. The current bandwidth demand is the amount of bandwidth that the application would be using if no other applications were running on the node and if there were no limitations on the amount of data the application could send to the network. A ratio is calculated to determine the amount of the bandwidth demand currently being satisfied for each application, thus calculating the happiness factor for the application.

4 Claims, 13 Drawing Sheets

METHOD AND APPARATUS FOR ALLOCATING BANDWIDTH IN TELECONFERENCING APPLICATIONS USING BANDWIDTH CONTROL

BACKGROUND OF THE INVENTION

Teleconferencing systems among computer systems or work stations have become a common means for exchanging ideas among work groups of people located in different locations. Teleconferencing systems mimic actual meetings, in that the human users can see one another and talk to one another in real-time, without having to type in their messages into a keyboard or display responses as text on a monitor or a printer. Teleconferencing also allows multi-party communication, both in multi-directional conversations and in broadcast from one location to many locations.

A network may be a local network connecting a few machines to one another, or a much wider network connecting large numbers of different types of machines. Many networks, especially wide area networks, connect machines operating on different platforms, but provide consistent protocols to allow the machines to communicate. Various approaches to networking are known in the art, including distributed networks and centrally administrative networks.

FIG. 1 shows one example of a network. Processors 150C and 155C are each connected via a network adapter 160 and 165, respectively, to a network medium 170. The network medium 170 may be a digital bus, a video coaxial cable, a telephone line, a fiber optic cable, or any other medium through which information may be transferred from one location to another. It will be understood upon reference to FIG. 1 that other arrangements are possible, that the network may include more than two computer systems, and that each of the processors 150C and 155C may be connected via other network adapters to other network media.

Each of the processors in the computer systems shown in FIG. 1 has a video monitor at 150D and 155D, a video input 150A and 155A, an audio input 150B and 155B, a keyboard input 150e and 155e having a mouse, and possibly other peripheral input output devices connected thereto. It will be understood that each computer system may also comprise multiple processors sharing a network adapter, forming a local network within the larger network shown in FIG. 1. Computer systems such as 150 and 155 may connect to a number of network media having differing types of media substrates, and further having different network protocols. Processor 150C and 155C each display images on the video monitor 150D and 155D, respectively, and receive inputs from other peripherals. Processors may also be running computer programs, including application programs and transport layer programs, that may call one another and serve one another, exchanging data, addresses, and control signals.

One embodiment of a possible computer system operating according to one embodiment of the present invention, is shown in FIG. 2. A processor 302 is connected via a system bus 301 to a main memory 304, a read only memory 306, and a mass storage device 307. The main memory may be a volatile memory array composed of dynamic random access memory. The read only memory 306 may be composed of a CD ROM, an initialization cache, erasable programmable read only memory, EEPROM, flash memory, or other read only memories. The mass storage device 307 may be configured as a disk drive writing to, and reading from, hard disks, floppy disks, or other storage devices. Processor 302 may also have a cache, either a write back or read through configuration, storing frequently used values in a static random access memory or other memory array, the cache in some configurations being coupled directly to main memory 304. Various other intelligent cards may be connected to the bus 301, including direct memory access devices.

Also shown in FIG. 2, various peripherals exchange information via bus 301 with the processor 302, main memory 304, read only memory 306, and mass storage device 307. These peripherals include a display 321, and frame buffer 341, generally a video monitor or printer 329. A keyboard 322 is also coupled to the bus 301, permitting alphanumeric entry. A cursor control 323 coupled to the bus 301 may be configured as a mouse or track ball. A sound output device 321, also coupled to the bus 301, may be configured as a loud speaker or a number of loud speakers. A video input device 325 may be configured as a video camera, a scanner, a fax input, or similar device, and is coupled to the processor 302 via bus 301. A sound input device 326, also coupled to the bus, may be configured as a microphone or a sound synthesizer, or may be a telephone connector. A network or communication medium connector 342 allows communication between any of the above devices and a network or communication medium. Finally, a communication device 327, also coupled to the bus 301, allows communication between any of the above devices and the network (or other communication) medium 170 via the network/communication adapter 160. In some embodiments, the networking medium is a digital communication medium, allowing high speed digital communication between computer systems over the network.

Various network configurations are known in the art: star configurations, daisy-chained networks, etc. The computer system, in some embodiments, is connected via a network adapter to a network medium that allows the computer system to communicate with other computer systems at other locations. The other systems may be coupled to the same medium substrate, or may be connected to other processors or intelligent devices that are in turn connected to the substrate.

A processor or processors of the computer system as used in one embodiment of the present invention generally has software operating thereon, including teleconferencing applications. Data is transferred over the network by the teleconferencing applications, including but not limited to, voice, video, and other data. The data may have been created by the same application that created it, or may have been created by another application. Other applications may also be operating on the computer system, sending or receiving documents, for example. Also, other teleconferences may be ongoing at the same time, each supported on the same network. When several teleconferences are ongoing at any given time over the same network, it may be that each includes a different subset of the sets of computer systems connected to the network. Teleconferencing applications often also allow other computer systems to join ongoing teleconferences by selecting which teleconference a user at the other computer systems wants to call, or drop out of teleconferences by terminating connections.

FIG. 3 illustrates a hierarchy of programs or of levels of abstraction in a single program, allowing an application to communicate over a network. The application program 401 includes a presentation layer and a human user interface for exchanging information with a human user. Various applications programs may call software at conferencing layer 400 that has its own protocols for exchanging information with the application and with the lower layers of the communication system. The conferencing layer software used by a particular application program parses the information exchanged with the human user into messages provided to one or more transport components 402. Each transport layer exchanges information with the conference layer, and provides packets of information suitable for a particular network component 403. The network layer exchanges information with the transport layer, and provides data in a form appropriate through a system network component to the network adapter 160.

Among the applications that may be run on a processor are teleconferencing applications. Teleconferencing applications generally allow a user to view video images, send video images, and/or send and receive audio over a network, generally in real time. Real-time requires not only data transmission of a fairly large amount of data, but also requires a high degree of synchronization among the data when packets are reconstructed by a receiver system; if a voice, for example, arrives before a video image of a person speaking, the sound and video must be synchronized when presented by the application running on the receiver system. Voice (or other sound), video, and other signals, including control signals, must be presented to the higher-layer at a proper timing to have the proper meaning.

Problems arise, however, when a large number of applications on a given network node generate signals for transmission across a network or other communication medium. For example, when a particular computer or workstation is running several teleconferencing applications simultaneously, or running several other applications that similarly require network bandwidth, the applications vie for access to the network against one another. It will be understood that "network" refers generally to any shared communication pathway from one system to another, and specifically to a shared communication pathway of limited data capacity in terms of bandwidth or data rate. Generally, each layer of software, including the transport layer and other lower level communication layers, like the hardware, have bandwidth restrictions limiting the amount of information that may be provided from any given system to the network in a given period of time. Therefore, applications compete for output bandwidth against one another, and in many systems the first to claim a bandwidth can use that bandwidth to the exclusion of other applications.

The problem is especially acute when a teleconferencing application is used, in that teleconferencing applications require such a large bandwidth commitment, and generally lack flow control that would limit the flow of data from the application to the network when the network is heavily used.

Sharing bandwidth fairly is a practical concern. A network may include any number of systems. A network may also include multiple simultaneous teleconferences. A particular system on the network may be involved in more than one simultaneous teleconference; the teleconferences may be running under different applications, or under different copies of the same teleconference. Multiple applications or other processes on a computer system may have access to a network or other communications medium. Any given teleconference may require a system to provide teleconferencing messages to any number of the other systems on the network. The simultaneous teleconferences at a given system may run under different teleconferencing applications, compression schemes, and update rates, and the different messages may be addressed to different nodes on the network, and to any number of nodes. All of these increase the use of bandwidth by a system.

The number of recipients of a particular message, sent over the network from a particular system, in the context of a particular teleconference, running in a particular application or copy thereof, is the "fan out" of the teleconference message. When the number of parties to a teleconference becomes very large, the fan out becomes very large as well. This can burden the network, since each teleconference within each application may require a separate message to be sent to each other system participating in the teleconference. Some teleconferencing applications do not have "multi-cast", which is a feature that allows a single message to be received by multiple nodes on a network, but some teleconferences must send a separate message to each other participant in a teleconference, imposing an enormous burden on the network transport layer programs when the number of nodes participating in the teleconference is high, and when several teleconferences or other network-using applications are ongoing simultaneously.

Excessive bandwidth use by any given connection presents another problem. Teleconferencing systems and other network bandwidth users exist that expand to fill all available bandwidth. For example, teleconferencing systems may send video updates as frequently as is possible given a particular bandwidth availability. Some flow control schemes assign bandwidth on a first-come, first-served approach among the applications, and later-initiated network applications must wait in a "queue" until earlier applications have completed transmission or receipt of the network message. Because teleconferencing applications generally do not have flow control while other network applications frequently do, the non-teleconferencing applications can be slowed down tremendously when teleconferencing is in use. Other network transmission applications, for example, faxing of documents, can compete with the video or audio teleconferencing systems for bandwidth, and together with such systems can occupy all available bandwidth. Most non-teleconferencing applications have an internal flow control that identifies bandwidth limits and reduces data rate accordingly; however, the methods used are not appropriate for real time teleconferencing applications. Such other file transfers occupy bandwidth as well. When an aggressive application sends excessive numbers of video update frames or otherwise occupies bandwidth that can better be allocated to other applications, the other applications (such as file transfer, faxing, etc.) slow the rate at which the non-teleconferencing applications send data. Teleconferencing applications generally do not have flow control features, and so provide data to a network or communication/transmission medium at an rate that is less predictable. Teleconferencing applications can easily slow down other applications to an almost stand-still rate.

Application-specific solutions are not enough to solve the problem. Even node-specific solutions cannot eliminate the problem. Some application-specific flow control processes switch to better compression algorithms, transmit fewer updates, transmit sound in mono instead of stereo, require a smaller video window, or otherwise reduce bandwidth consumption when bandwidth is at a premium. However, these systems only affect bandwidth use by the application itself, and do not accommodate other applications.

Error-correcting protocols are not appropriate for real-time applications. These protocols are useful in correctly transmitting files having exact information, such as a spreadsheets or other documents, in which small errors must be corrected and re-transmissions do not create problems, and so are commonly available among transport layer programs. Error-correcting protocols, such as most transport-layer protocols, are inappropriate for conferencing or other real-time applications. Error correcting protocols require re-transmission of erroneous packets of data.

Therefore, it is desirable for a system to be found that can allocate bandwidth among applications to prevent one application from excluding other applications from the network. Also, because an application running on one workstation or computer can reduce bandwidth available to other computer systems and to other users when systems share access to a common network or other communication medium, it is desirable to have a central control for administration of the bandwidth allocation to prevent an application from interfering with other applications. It is also desirable to protect the bandwidth allocation from manipulation at the workstation itself, to prevent users from changing the allocation once it is established. It is also desirable to allow network management process to manipulate or alter the variables as needed.

SUMMARY

In the present invention, in some embodiments, an administrator assigns a total bandwidth allocation to at least one other computer system, and the computer system parcels the bandwidth among the applications running on the computer system. In the operation of one embodiment of the present invention, an administrator sends a bandwidth maximum allocation to each node on the system. Each node determines a current bandwidth being used, and limits the current bandwidth to this allocation. Thereafter, each node then reallocates its usable bandwidth among applications running on the nodes that are attempting to send messages over the network. For each application, a current bandwidth use is determined, as well as a current bandwidth demand. The current bandwidth demand is the amount of bandwidth that the application would be using if no other applications were running on the node and if there were no limitations on the amount of data the application could send to the network. A ratio is calculated to determine the amount of the bandwidth demand currently being satisfied for each application, thus calculating the happiness factor for the application.

FIELD OF THE INVENTION

The present invention relates to computer networks, and more specifically to network administration.

BRIEF DESCRIPTION

Figure 8A:
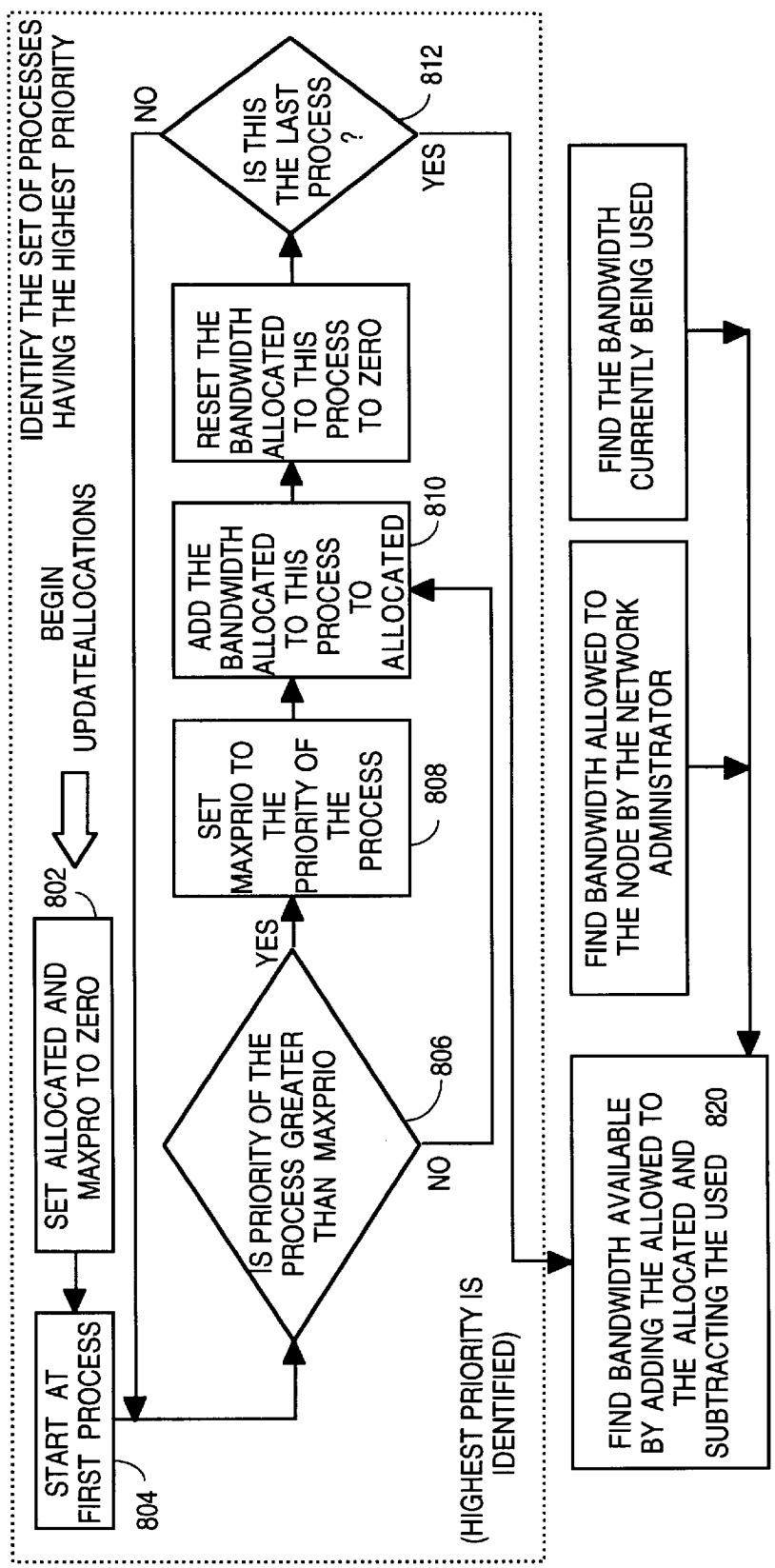
Figure 8B:
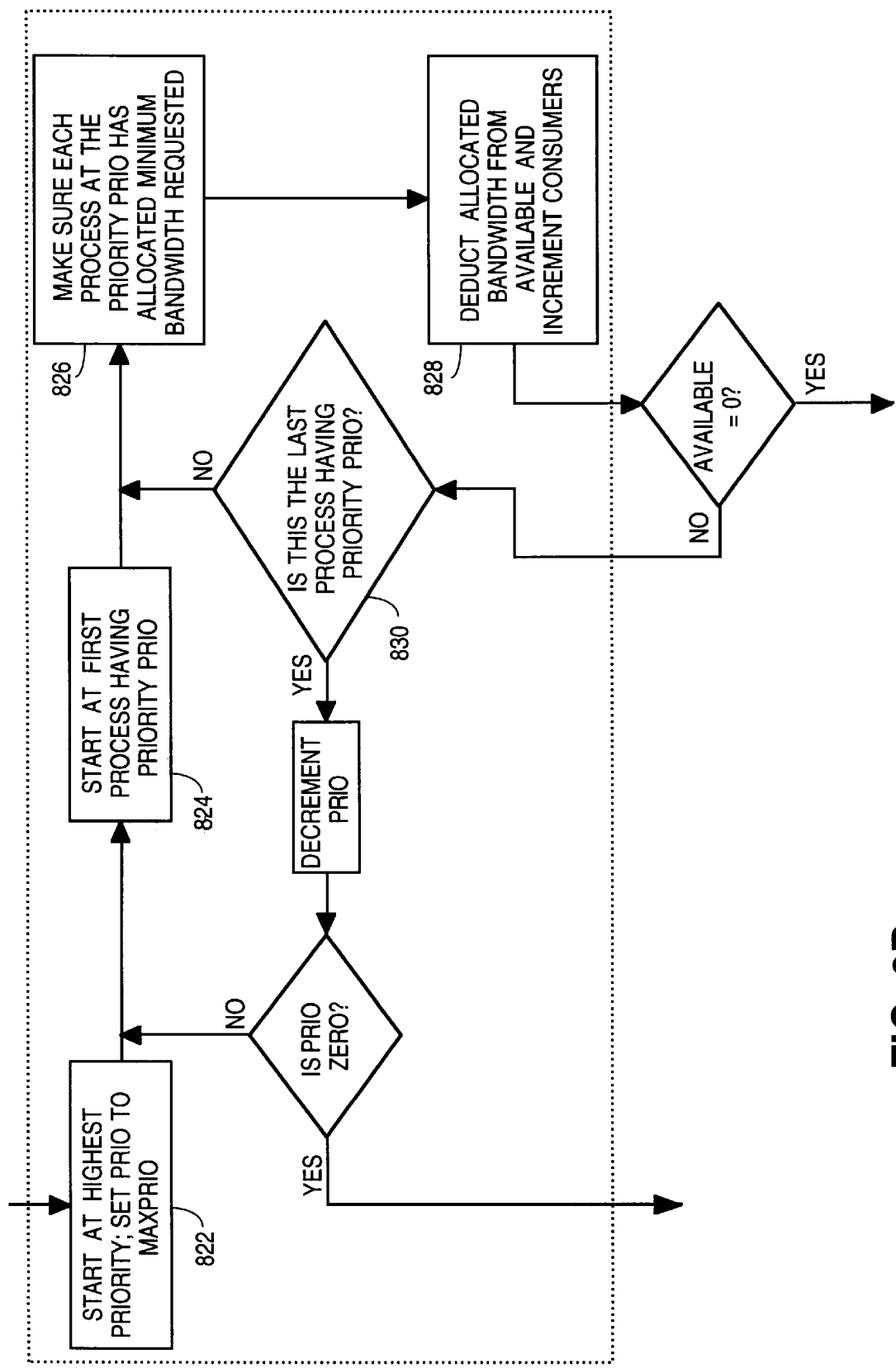
Figure 8C:
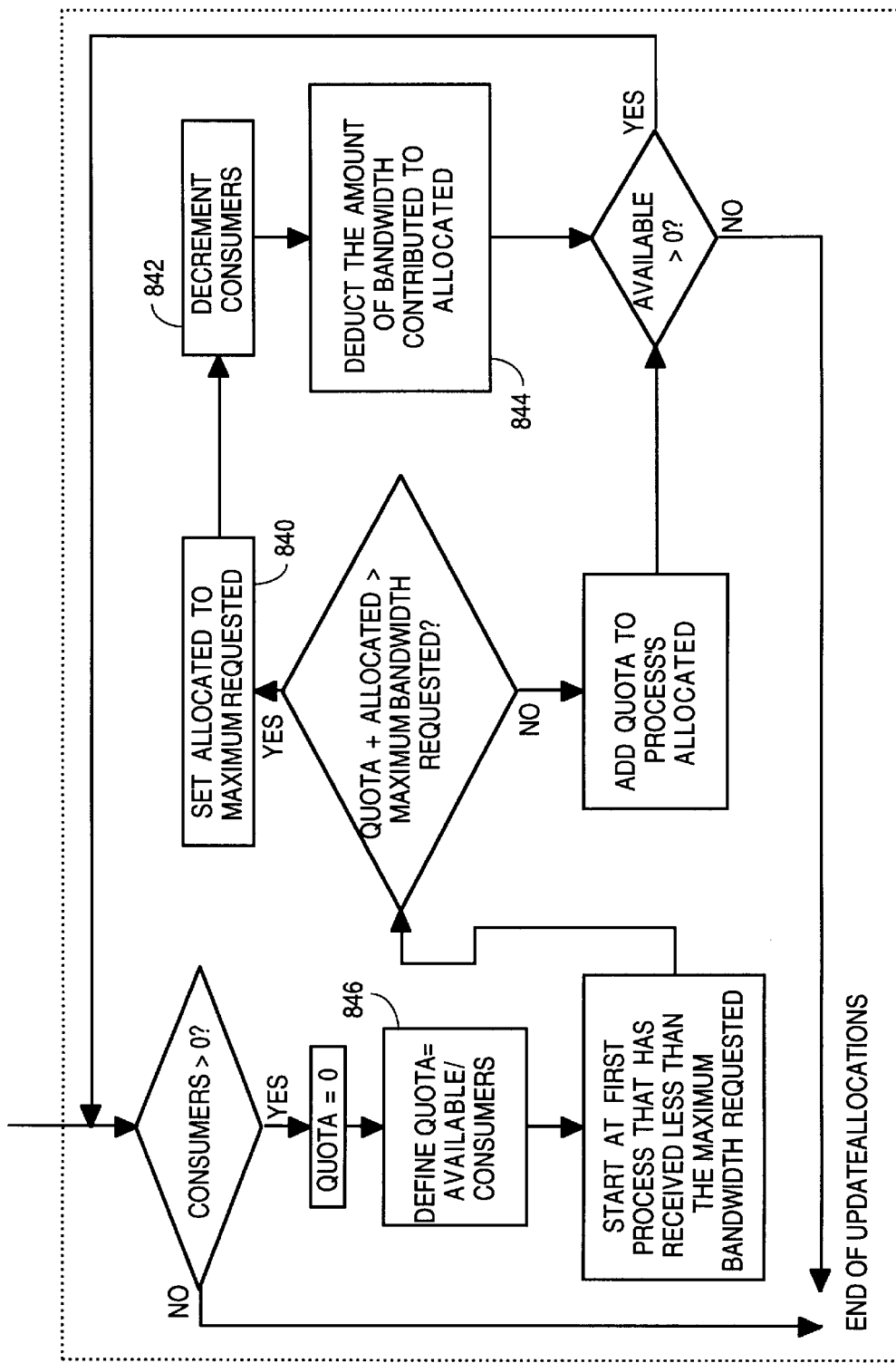

FIGS. 8A, 8B, and 8C show Update allocations as implemented according to one embodiment of the present invention.

Figure 9:
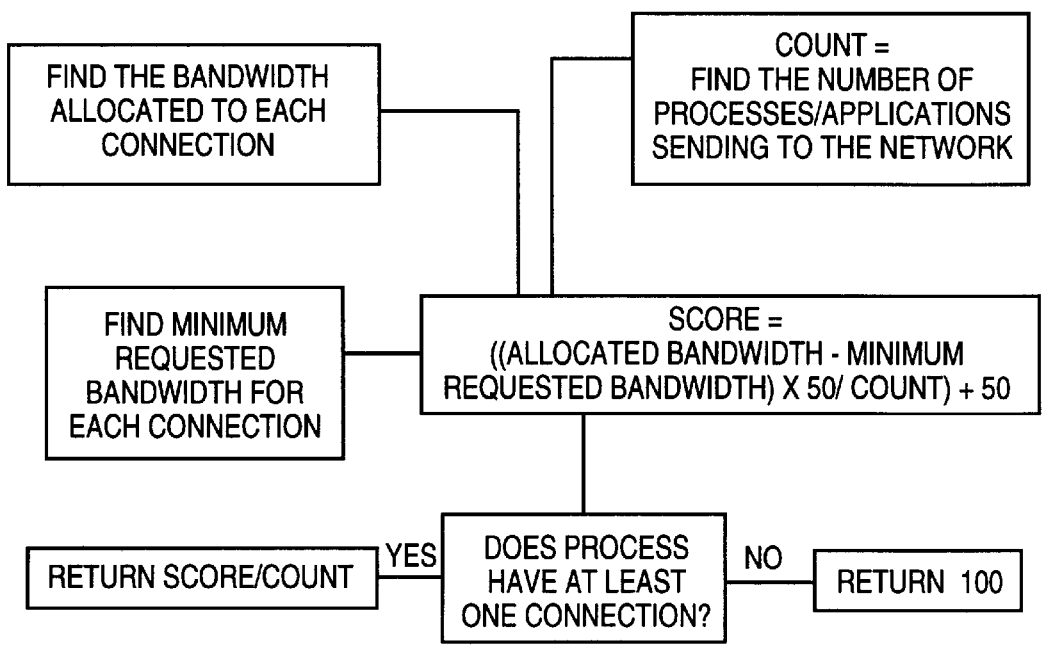

FIG. 9 shows BlueDotQueryHappiness as implemented according to one embodiment of the present invention.

Figure 10:
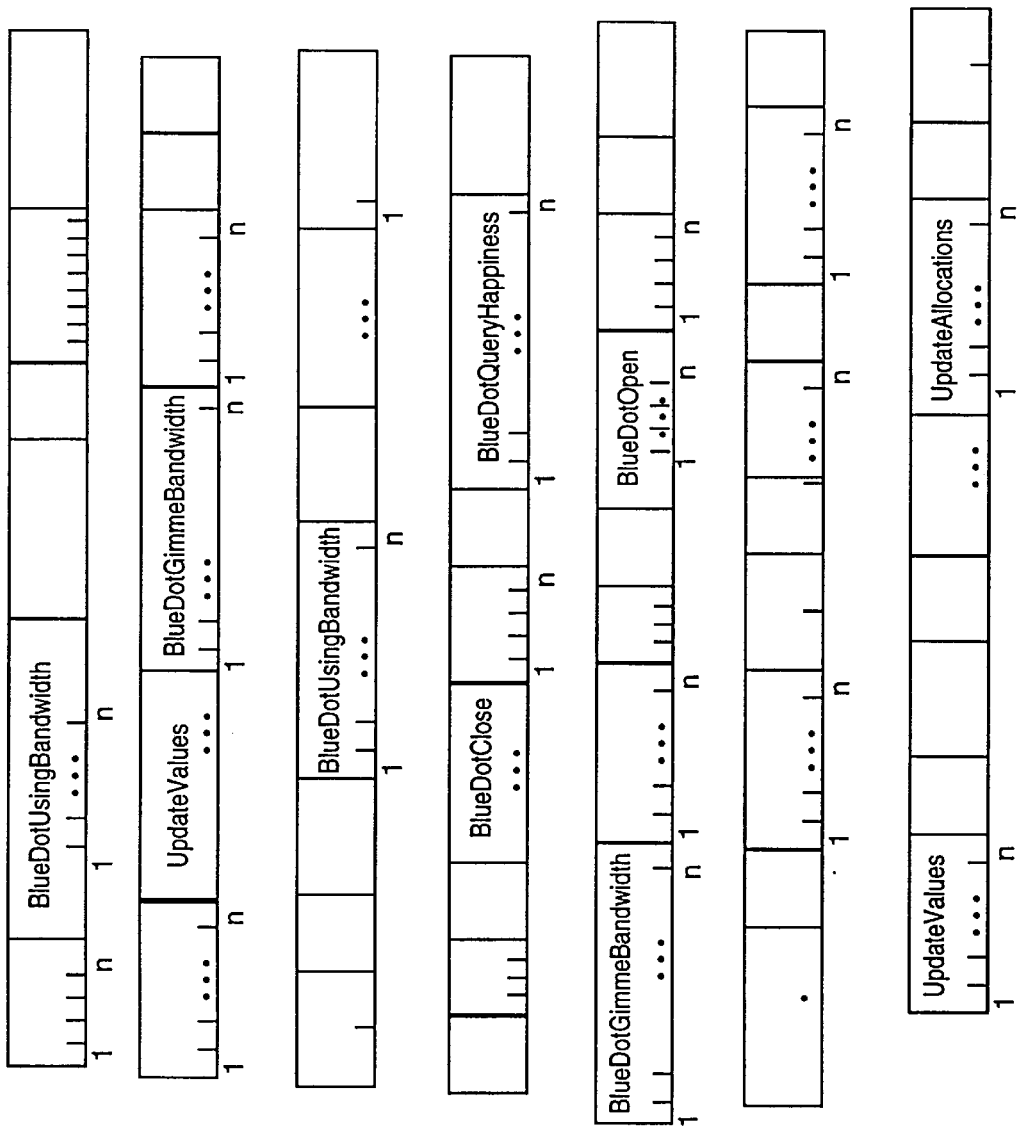

FIG. 10 shows a memory array storing steps to be performed at the client (non-administrator) node.

Figure 11:
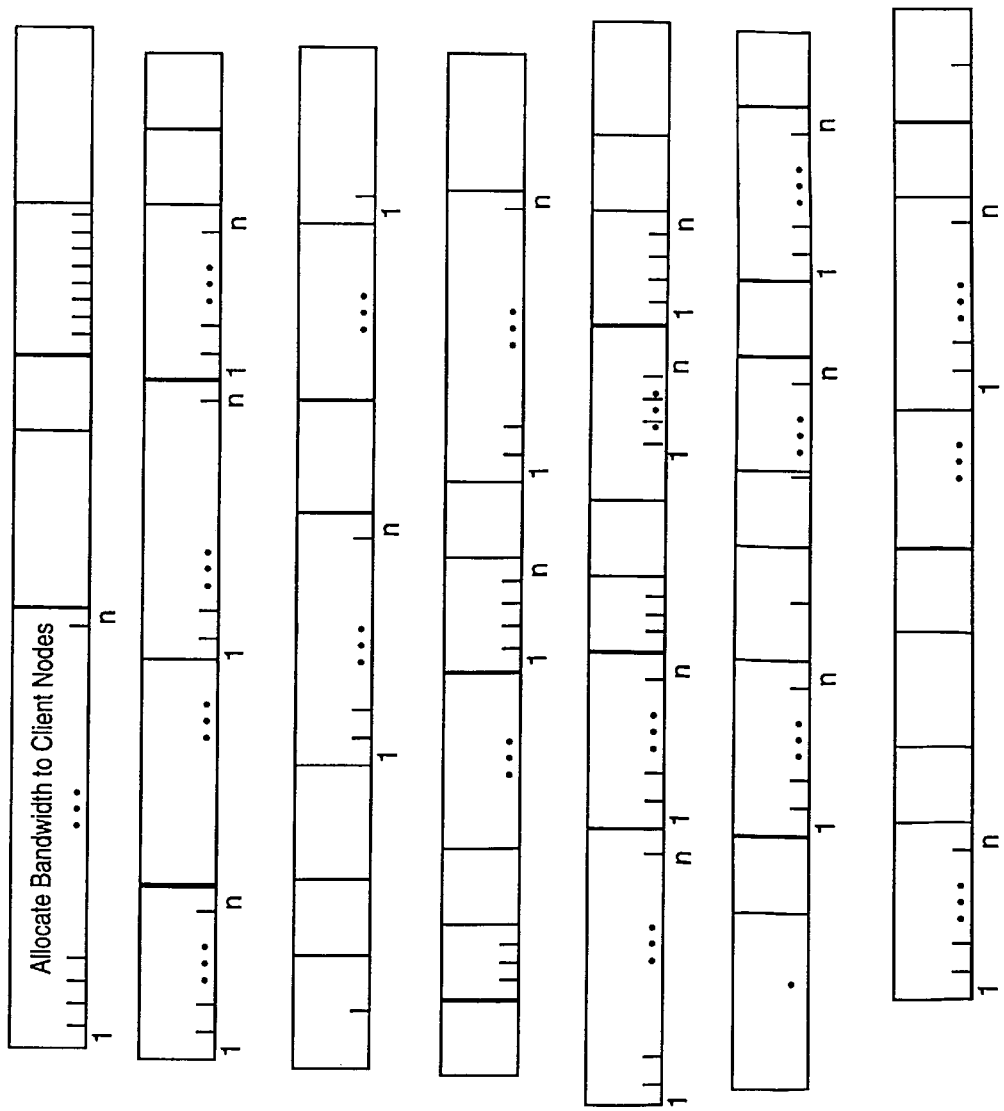

FIG. 11 shows a memory array storing steps to be performed at the administrator node.

DETAILED DESCRIPTION

In the present description, the terms "computer system", "work station", "machine", and "node" will be used interchangeably so as not to obscure the present invention needlessly. It will be understood that any of these may be replaced with a plurality thereof, or may be replaced with other intelligent systems such as servers, remote dedicated machines. Computer systems, dedicated servers, work stations, and other machines may be connected to one another across networks. For simplicity of explanation, the terms "machine", "computer system", "work station", and "node", will be used interchangeably, although it will be understood that each may refer to a single intelligent system or to a distributed sub-network sharing a network adapter to the network administrated by the described network administrator.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright Apple Computer, Inc.

In a network-level aspect of the present invention, a client system receives a value from an administrator node and determines the bandwidth allocation.

A network administrator node is a computer system on a network that controls network access of other nodes on the same network. A network administrator node must exchange information with the other nodes on the network, however, to ensure that higher priority uses of the network bandwidth receive a greater access than those with lower priority uses. However, the network administrator must also be able to limit network access by aggressive though low priority applications, or a low priority application use might capture the network, preventing higher priority users from gaining access. Also, within each computer system, various intelligent components must share access to the network adapter, often requiring local arbitration of network demands.

Although local arbitration may be performed by the computer system itself, a central network administrator in a centrally administrated network prevents usurpation of the network bandwidth by limiting network access of each computer system on the network. The administration of the network is flexible, however, in that a read only variable provided to the network by the computer system informs the administrator of the bandwidth of the messages the various programs and processors are trying to put on to the network.

The applications transfer data by calling other lower-level programs on the computer system that convert the data into a more easily transferred form. Standard forms are packets of data, that may be of any size. Packets of data are transferred to the network from the computer system via a transport layer protocol specific to the network medium and to the computer system.

Figure 1:
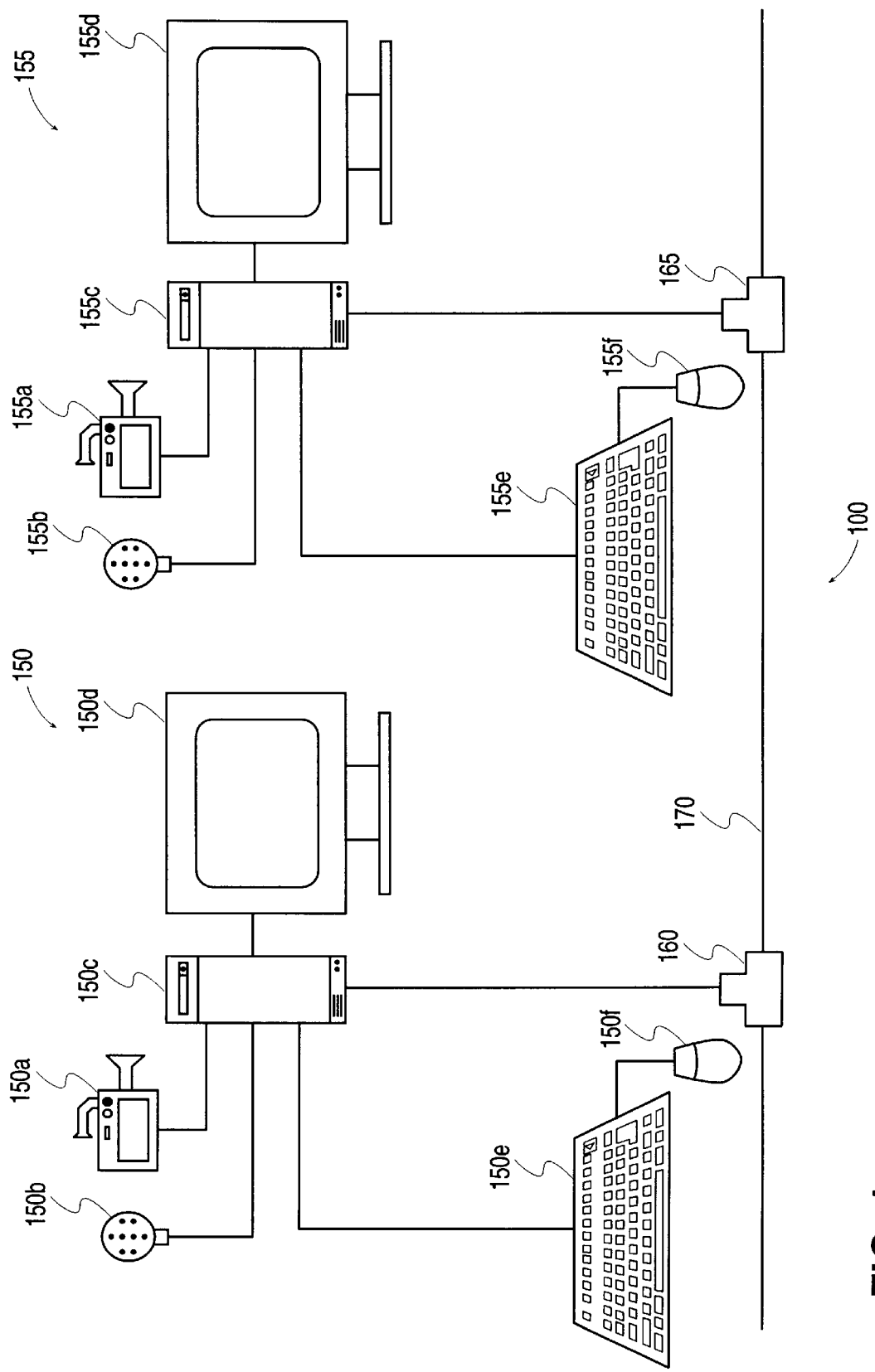
FIG. 1 shows one example of a network.
Figure 2:
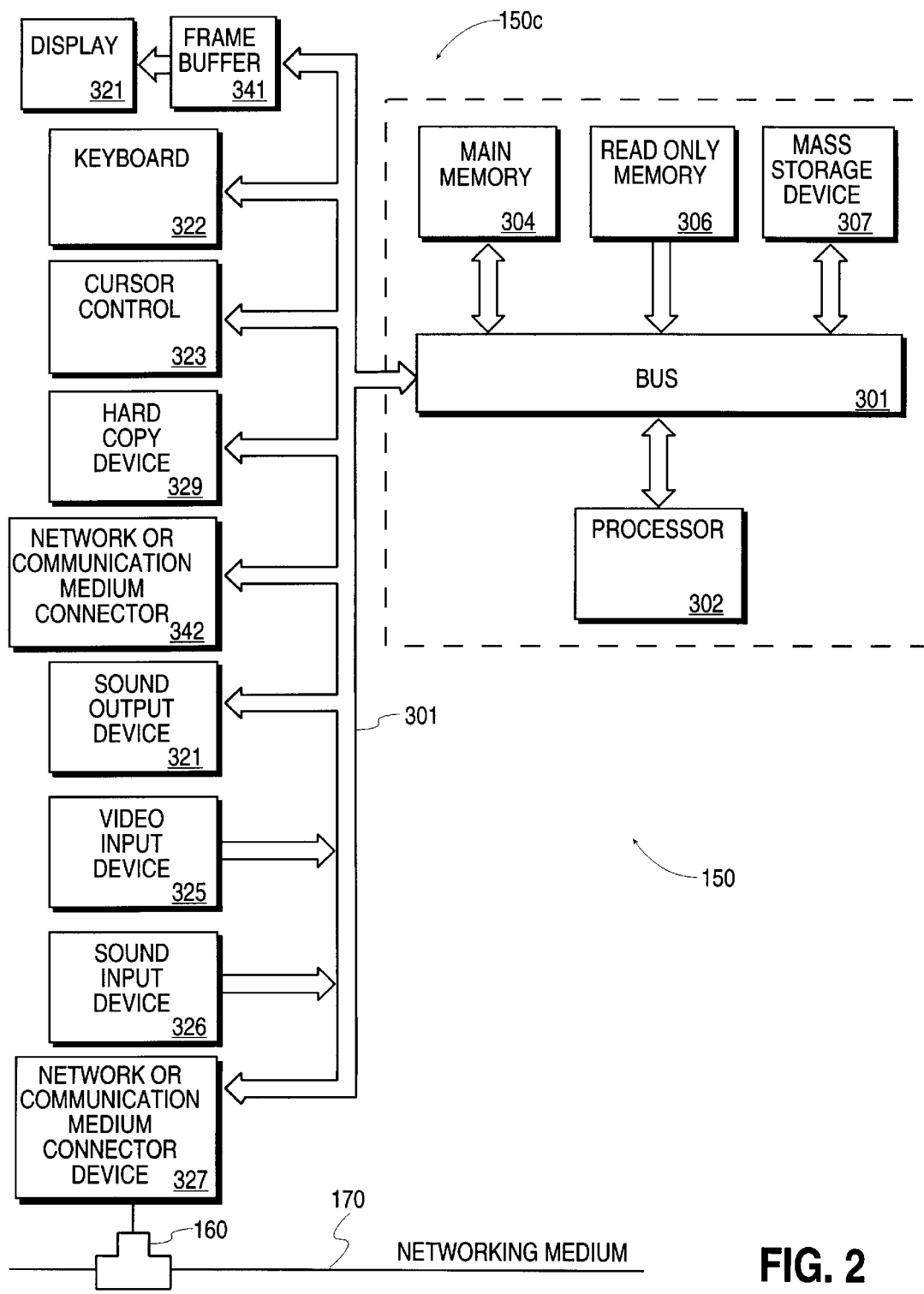
FIG. 2 shows one embodiment of a possible computer system operating according to one embodiment of the present invention.
Figure 3:
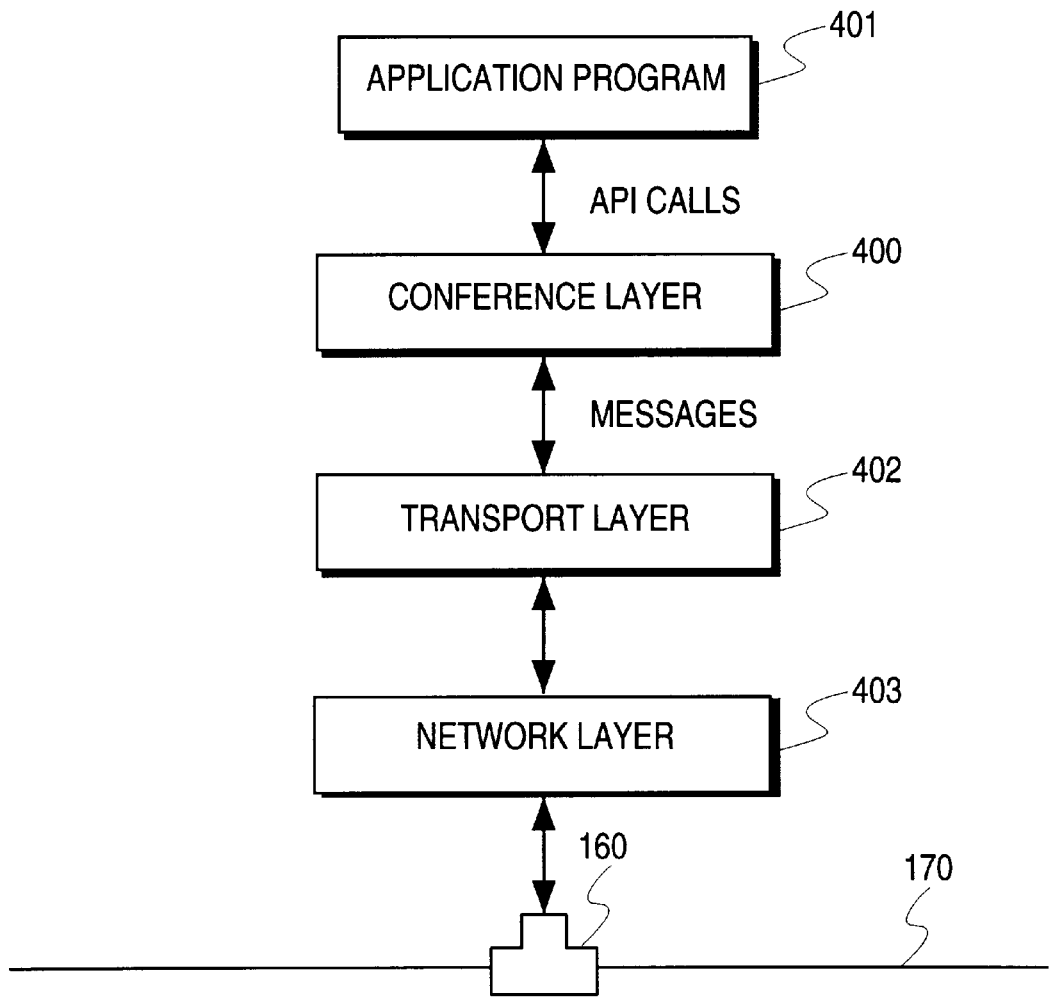
FIG. 3 illustrates a hierarchy of programs or of levels of abstraction in a single program, allowing an application to communicate over a network.
Figure 4:
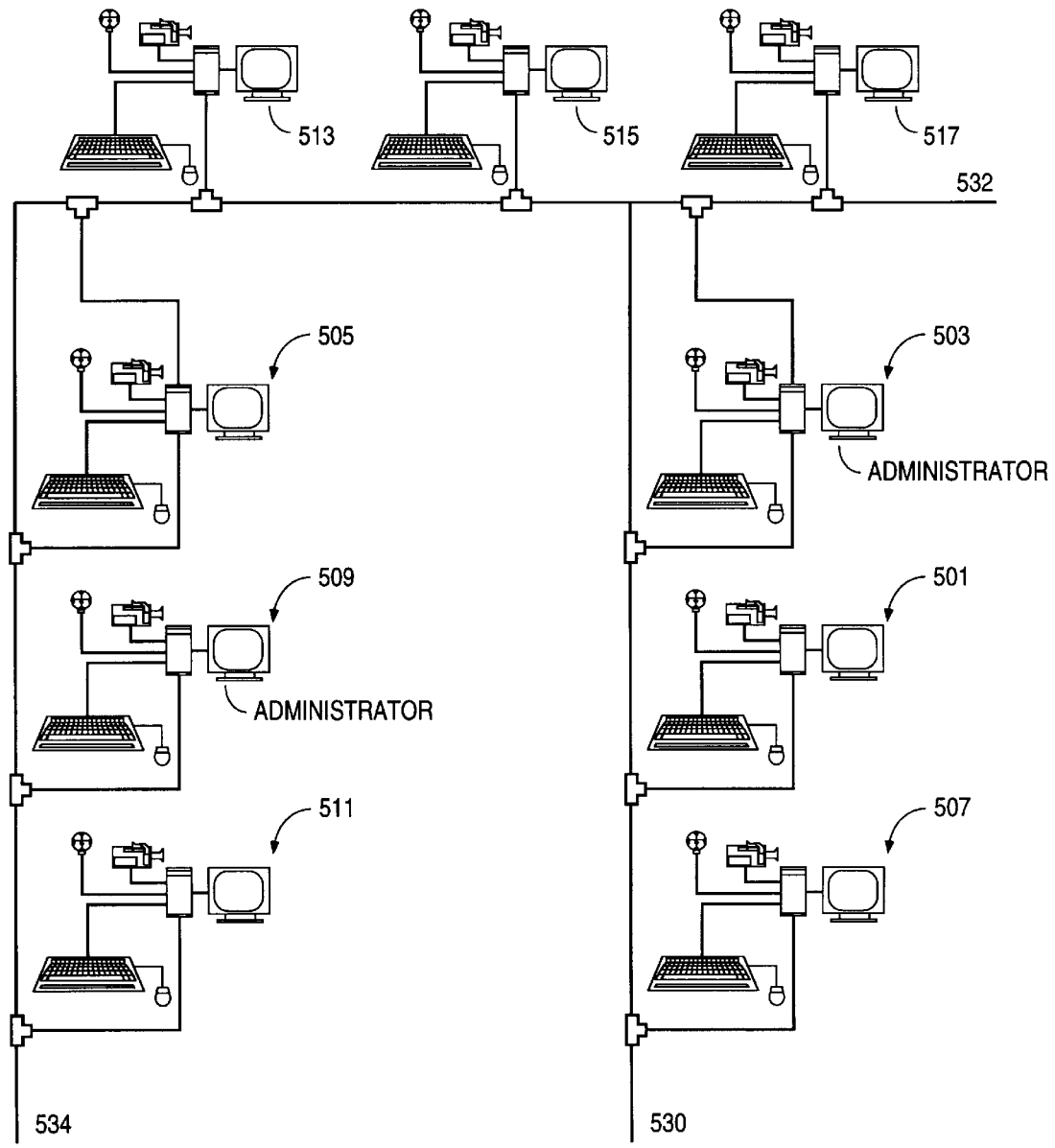
FIG. 4 shows a managed network of nodes comprising work stations or other computer systems and permitting a number of teleconferences to operate over the network among the nodes.

FIG. 4 shows a managed network of nodes comprising work stations or other computer systems and permitting a number of teleconferences to operate over the network among the nodes. Systems 501–517 are individually coupled to one or more network media, allowing communication over the network. Some systems 503, 505 appear on more than one network, and may allow communications between one network and another. For example, system 503 can provide data to, and receive data from, network or communications media 530 and 532, or can facilitate exchange of data between the network or communications media 530 and 532, Other systems 501, 507–517 appear on only one network.

On any given network or communications medium, one or more administrators may be present, assigning allocations of bandwidth to each of the nodes (computer systems) on the network or communications medium. For example, system 501 can be assigned a maximum bandwidth allocation by a network administrator. In some embodiments, a network administrator allocates bandwidth immediately; in other embodiments, the administrator waits until bandwidth use of the network or communications medium reaches a predetermined value before allocating maximum bandwidth allocations. In some embodiments, only some of the systems are assigned a maximum bandwidth allocation, while others are not; in other embodiments, each system is assigned a maximum bandwidth allocation, though the allocations are not uniform throughout the cluster of computer systems coupled to the network or communications medium. As will be explained below, the administrator receives certain values from the other systems coupled to the same network or communications medium, and these values can change over time, so that the allocations can also change. For example, a system may discontinue transmission of data, or higher-priority users may begin. As will also be explained below, processes running on the client (that is, non-administrator) nodes also receive values from the network or communications medium, the values including the maximum bandwidth allocation. At each client node that receives such an allocation value, either all applications or a group of applications in a selected class are limited in their ability to send data to the network or communications medium, the limit imposed by various embodiments of the present invention.

The present invention includes in one embodiment a means for a network administrator to control the bandwidth used by each system node in a distributed network, and further allows each node to allocate among the applications running thereon the bandwidth in a fair manner. The network administrator can alter the bandwidth allocation among the various workstations, servers, or other processing nodes in the network, thus reallocating bandwidth among the nodes.

The network includes an administrator node, operated by a network administrator. The network administrator may be controlled by a person, or by a computer program. Other embodiments allow some management functions to be shared by two or more processes on the manager node. Although the functions of the administrator may in some embodiments be performed by two or more manager nodes, in general the described embodiment includes only one administrator performing all network administration functions. Various signals are communicated from each non-administrator system over the network to the administrator, and signals are received from the administrator. According to these signals, the described embodiment of the present invention locally manages network bandwidth used by applications operating thereon.

A network administrator detects the additional network bandwidth demand, and, according to one embodiment of the present invention, sets a bandwidth maximum allocation for each node. If one teleconference requires greater bandwidth than another, the network administrator can set the bandwidth allocations differently for the nodes participating in the different teleconferences. At the nodes that participate in more than one teleconference (or other application requiring sending messages to the network), the allocated bandwidth is further allocated among the various teleconferencing and other applications attempting to send messages to the network. In one embodiment of the present invention, the network administrator monitors the nodal happiness factors set as a read only variable by each node, and can adjust the maximum bandwidth allocation per node accordingly. Although users at each node might change the teleconferencing application or otherwise demand additional bandwidth, for example, by turning off data compressors or by transmitting in stereo, the node cannot reset or alter the maximum bandwidth allocation determined by the network administrator.

In one embodiment, a network administrator publishes one variable over the network for each of the nodes on the network, and the client nodes publish three other variables. The network receives the variables determined at each node, and each system receives the value determined for the variable by the administrator. The four variables are:

the current total bandwidth being used for all conferencing functions on each particular machine, measured in one embodiment in bytes per second;

the number of active applications that are capable of sending messages over the network in the immediate future, a value that may be zero if the particular machine is merely receiving (and not sending) messages;

a maximum allowed bandwidth per node, assigned by the administrator;

and the number of active connections on the node.

The variables can contain values pertaining to any group of bandwidth users, although in the preferred embodiment, the group of bandwidth users consists of the group of teleconferencing applications. It will be apparent, however, that the group of all applications, any group of processes operating below (or above) the level of applications, or even hardware could have been selected.

With the exception of the allowed bandwidth per node, the values are determined by each non-administrator node and provided to the administrator via the network. The administrator node thus monitors: total bandwidth use by each node, the number of active applications currently transmitting (that is, sending) data over the network from each node, and the number of connections at each node.

The number of connections at any given node may be considered a total of the fan out values taken over all active applications. As stated above, the fan out is the number of separate copies of teleconferencing data that must be sent to the network or communications medium due to the number of receivers participating in the teleconference. If a feature called "multi-cast" is available, then all addressees can receive the same copy, and only one need be sent, and the fan out is one. If multi-cast is not available, then a separate copy is sent to each recipient, and the fan out is the number of recipients. If several applications are running on a computer system or if the computer system is engaged in several teleconferences, the fan out of each is totaled to derive the number of connections at the node. This total number of connections is provided to the network.

In response to these values from the various non-administrator nodes, the administrator assigns a maximum bandwidth to each node. The network administrator can also determine a priority for bandwidth use among applications, or can allow system processes on each node to determine priority. The maximum bandwidth is provided over the network to each of the non-administrator nodes. The administrator is not limited in bandwidth allocation; for example, maximum bandwidths need not be uniform across a network. Different nodes have different bandwidth needs and different priorities. Some nodes, for example ATM switches, have very large bandwidth availability; other nodes may be daisy chained via an ethernet connection to a large network of nodes, each of whom is contending for bandwidth. Also, if a network is distributed into segments interconnected via routes, local boxes, or ethernet boxes, each node may be given a larger bandwidth allocation, since nodes in each segment may be sending simultaneously. Because of these and other non-uniform requirements, different nodes can be allocated different bandwidth allocations.

Because only the administrator has access to the maximum bandwidth, only the administrator can change the maximum allowed bandwidth of any machine on the network. Without this access, no machine can change even its own maximum allowed bandwidth.

Occasionally, a machine runs several conferencing applications having different fan outs and may also be sending files or faxing documents over the network, sometimes to other nodes involved in a particular conference, and sometimes to other nodes. As indicated above, however, the maximum bandwidth allocated by the administrator applies only to the selected group of applications, e.g. in the described embodiment, only to teleconferencing applications. Thus, only teleconferencing applications are bandwidth-limited by this embodiment of the present invention; other applications can use bandwidth unrestrictedly.

Computer systems on a network may use less than all the bandwidth assigned to them. Although an assignment of bandwidth from the administrator serves as a maximum, the current bandwidth being used may be far less than the assigned maximum; in fact, the current bandwidth being used may be zero, for machines that are receiving data without sending data over the network.

In a system-level aspect of the present invention, the client processor reacts to the maximum bandwidth allocation sent to the system by the administrator. In one embodiment, the Blue Dot process includes the following "external" routines, which exchange data with the various applications that call the Blue Dot process: BlueDotUsingBandwidth, BlueDotGimmeBandwidth, and BlueDotQueryHappiness. Each of these will be discussed in detail, and one embodiment of each presented.

BlueDotUsingBandwidth monitors bandwidth use, determined by accumulation. In one embodiment, monitoring of bandwidth is performed by a data splitter that periodically calls BlueDotUsingBandwidth. The process BlueDotUsingBandwidth exchanges information with the lower-level software serving each application, calculates the bandwidth used, calculates the fan out (i.e., the number of copies of each packet that must be provided to the network or communication medium) by each application, and calculates the total number of conferencing applications participating with Blue Dot. Thus, BlueDotUsingBandwidth derives the three values corresponding to the three variables produced by the node. Each of these values is stored in a location where all other applications on the system can find the values (and thereby update the values further). A data-splitter monitors bandwidth use, and calls BlueDotUsingBandwidth periodically.

Figure 5:
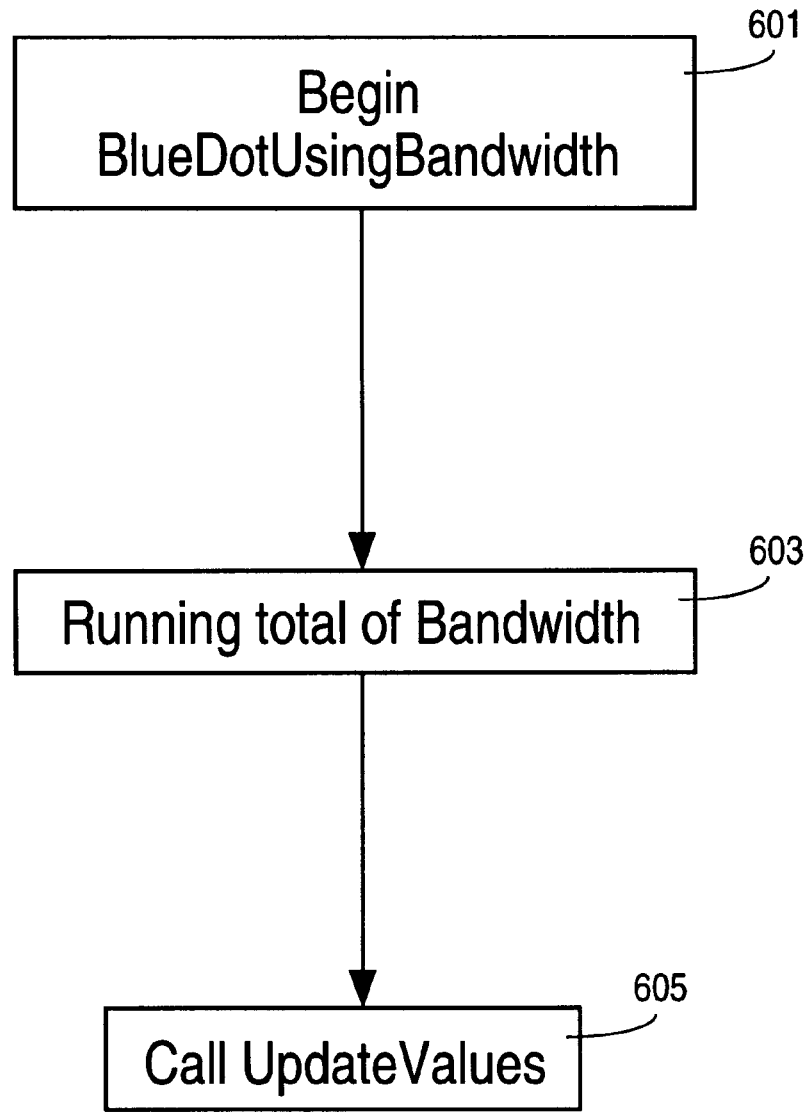
FIG. 5 shows BlueDotUsingBandwidth as implemented according to one embodiment of the present invention.

In one embodiment of the present invention, shown in FIG. 5 BlueDotUsingBandwidth records 601 the bandwidth used, in bytes per second, for each application on the node attempting to send data over the network. The BlueDotUsingBandwidth maintains 603 a running average of bandwidth demand. The running average maintained by BlueDotUsingBandwidth eliminates transient bandwidth spikes, by producing an average of bandwidth demand for each application currently demanding access to the network, and constantly or periodically determines the average number of bytes per second each application has attempted to send to the network for the past predetermined number of seconds.

BlueDotUsingBandwidth may be implemented using the following code:

```
__BlueDotUsingBandwidth(
    GlobalsHandle              gh,
    long        fanout,
    long        bw
){
    GlobalsPtr              gp = *gh;
    gp->customer = TcConnection;
    gp->bandwidth = (bw + gp->lastBandwidth) / 2;
    gp->lastBandwidth + bw;
    gp->fanout = fanout;
    UpdateValues(gp->process->universals);
    return(noErr);
}
```

Figure 6:
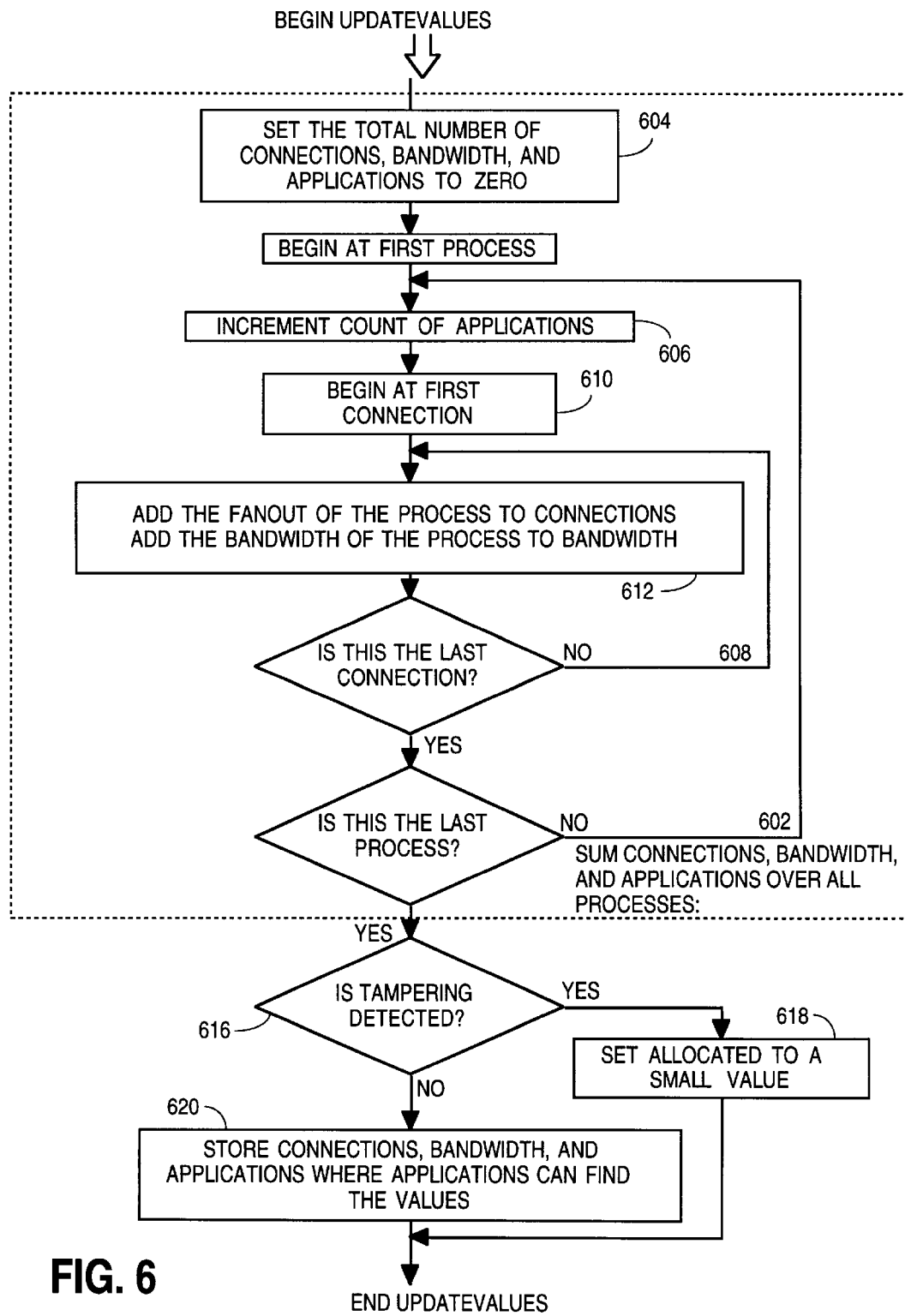
FIG. 6 shows UpdateValues as implemented according to one embodiment of the present invention.

BlueDotUsingBandwidth calls UpdateValues 605, which actually performs the steps of determining the values of the variables mentioned above (fan out/number of connections, number of applications, and total bandwidth being used). As implemented according to one embodiment of the present invention, UpdateValues is shown in FIG. 6.

UpdateValues determines the number of conferencing applications that are running on the system. This is determined by maintaining a table in which all conferencing applications provide data when the applications run the embodiment of the present invention. For each application, the number of connections (i.e., the fan out associated with the application) is inserted into the table, along with the bandwidth being used by each application (i.e., the data transmission rate multiplied by the fan out). All of these values are stored in the table each time any of the Blue Dot processes are called, and the values are provided to UpdateValues. The system-level total of these values taken over all applications are also provided to the network.

UpdateValues operates across applications. UpdateValues includes a first 602 loop that counts the number of conferencing applications. The number of applications is initially set at zero 604. Each process is counted 606, until the final application has been counted. Nested within loop 602, UpdateValues proceeds to second loop 608 that totals the number of conferencing connections and also totals the current bandwidths being used by all of the individual applications. The second loop begins at the first process 610, and then proceeding through the processes that are engaged in a teleconference, adding the fanout and the bandwidth to each value 612. The total number of connections is also kept.

Once the last process has been tallied, UpdateValues proceeds to a subprocess that detects whether someone at a client (non-administrator) node has attempted to alter the bandwidth allocation. This is accomplished by detecting whether certain function sets have been manipulated such that the function sets cannot be used by UpdateValues. UpdateValues also includes a variable "hacker" that is used to determine whether a user of a system who does not have access to the permissions associated with network administration is nevertheless attempting to turn the BlueDot process off. In other words, Hacker becomes non-zero when tampering by someone other than the administrator is detected. When hacker is set, the system assigns a small allowed bandwidth. Hacker determines whether a user at a particular node has attempted to override the bandwidth allocation set by the network administrator, and, if unauthorized tampering with the value set by the network administrator is detected 616, hacker sets a standard bandwidth allocation 618. Hacker allows the network administrator to control the bandwidth used by a particular application. Hacker determines whether a user at a particular node has attempted to override the bandwidth allocation set by the network administrator, and, if unauthorized tampering with the value set by the network administrator is detected, hacker sets a standard bandwidth allocation. The standard allocation, in one embodiment, is much smaller than might otherwise be allocated.

UpdateValues then stores the four variables where other applications can find them, using the ChokerSet processes 620. The table also includes a predictive value of the number of bytes per second the application may be expected to attempt to send over the network over the next brief period of time, taking fan out into account. Thus, if an application is expected to send a 10,000 byte per second communication over the network with a fan out of two without multi-casting, the table would contain a value of 20,000. For example, update values might accumulate the total number of bytes each application has attempted to send over the network for the past five seconds, and, by dividing the total by five seconds, determines the average bandwidth use.

One embodiment of UpdateVariables may be implemented as the following code:

```
UpdateValues(
    UniversalBitsPtr                          ub
){
    GlobalsPtr      gp;
    ProcessStuffPtr ps;
    long    connections, bandwidth, apps;
    connections = 0;
    bandwidth = 0;
    apps = 0;
    for(ps = (ProcessStuffPtr) ub->processes.qHead; ps; ps = (ProcessStuffPtr) ps->qLink) {
        apps++;
        for(gp = (GlobalsPtr) ps->instances.qHead; gp; gp = (GlobalsPtr) gp->qLink)
                        if(gp->customer == TcConnection)
    {
                                    connections += gp->fanout;
                                    bandwidth += gp->bandwidth * gh->fanout;
                    }
            }
    if(ub->hacker)
        ub->allowed = kTeenyBit;
    else{
        EnterCodeResource() ;
        ChokerSetActiveApplications(apps) ;
        ChokerSetActiveConnections(connections) ;
        ChokerSetCurrentBandwidth(bandwidth) ;
        ChokerGetAllowedBandwidth(&ub->allowed) ;
        LeaveCodeResource() ;
    }
    ub->used = bandwidth;
}
```

Figure 7:
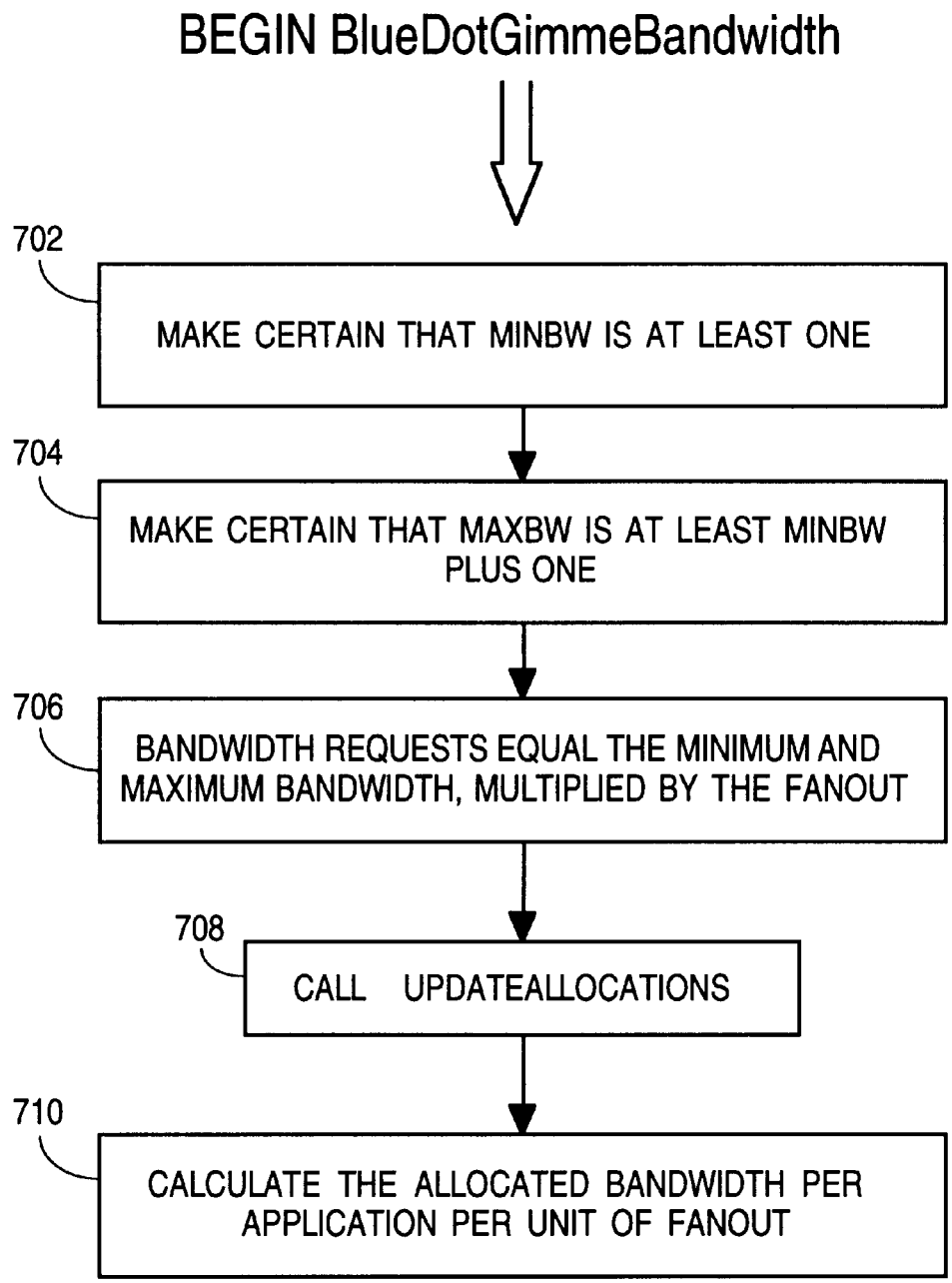
FIG. 7 shows BlueDotGimmeBandwidth as implemented according to one embodiment of the present invention.

In addition to BlueDotUsingBandwidth, the embodiment of the present invention described above also includes a routine BlueDotGimmeBandwidth, which is also called periodically. As implemented according to one embodiment of the present invention, BlueDotGimmeBandwidth is shown in FIG. 7. According to one embodiment of the present invention, each application not only stores the three variable described above (i.e., the current total bandwidth being used for all conferencing functions on each particular machine, the number of active applications that are capable of sending messages over the network in the immediate future, and the number of active connections), but also stores a minimum and maximum bandwidth that are desired by the application. Although these values are determined by the application, not by the embodiment of the present invention, their values are read by BluedotGimmeBandwidth. BlueDotGimmeBandwidth examines the bandwidth demands of the applications running on the node, and the minimums and maximums bandwidth requests mentioned above with respect to the table maintained by UpdateValues. The minimum and maximum bandwidth requests are limited to predetermined values; if the minimum requested is negative or zero, then the minimum requested is reset to one 702. If the maximum requested is for some reason less than the minimum, then the Maximum is set to at least one greater than the minimum 704. These limits prevent certain types of mathematical errors from occurring at the node. Then, a total minimum bandwidth request for an application is determined, by multiplying the bandwidth requested minimum by the fanout 710. This calculates the bandwidth requirements of the application to communicate with each recipient of the teleconferencing messages. Once the minimum and maximum bandwidth requested by each application is determined, BlueDotGimmeBandwidth calls UpdateAllocations 708. As explained below, UpdateAllocations tries to allocate to each application an amount of bandwidth between the minimum and the maximum. If less than the minimum demanded by a program is available, however, then zero is assigned. Also, no application gets more than its requested maximum. Finally, each application receives an allocation described in a bandwidth per connection 710.

Software associated with an application (generally, a low-level program called by a conferencing application as part of the I/O routines of the application) can thus request an additional share of the bandwidth allocated by the administrator. For example, a user changes operating parameters of a teleconferencing application by enlarging a window on a screen (thus increasing the number of pixels per video frame), or switching to a less effective codec, or transmitting sound in stereo instead of mono, then at a lower level software associated with the application requests additional bandwidth from a process running according to one embodiment of the present invention. The lower level software associated with the application provides the request by providing a minimum and a maximum bandwidth, and also by providing a fan out and a priority. The software associated with the teleconferencing application provides a request to one embodiment of the present invention, upon determining that the application will run more efficiently with additional bandwidth.

BlueDotGimmeBandwidth may be implemented according to the following code:

```
_BlueDotGimmeBandwidth(
    GlobalsHandle
gh,
    long        minBW,
    long        maxBW,
    short       priority,
    short       fan out
){
    GlobalsPtr      gp = *gh;
    gp->customer = TcFlower;
```

```
        if(minBW <= 0)
            minBW - 1;
        if(maxBW <=minBW)
            maxBW - minBW + 1;
        gp->minRequested = minBW * fan out;
        gp->maxRequested = maxBW * fan out;
        gp->priority = priority;
        UpdateAllocations(gp->process->universals) ;
        return(gp->allocated / fan out) ;
}
```

After calling UpdateAllocations, BlueDotGimmeBandwidth provides the maximum allocation of bandwidth per copy (taking fan out into consideration), for each process seeking transmission access to the network.

UpdateAllocations resets the allocation of bandwidth of each process that sends data to the network or communication medium. As implemented according to one embodiment of the present invention, UpdateAllocations is shown in FIGS. 8A, 8B, and 8C. UpdateAllocations includes a first loop, that iterates through the processes seeking network transmission access and determines (1) the priority of each process, and (2) the total of all the allocations assigned by UpdateAllocations the last time UpdateAllocations was called. To determine the priority for each process and the total allocation, variables ALLOCATED and MAXPRIO are initially set to zero 802. Starting at the first process 804, UpdateAllocations iterates through each process, determining whether the priority of the particular process is greater than MAXPRIO 806; if so, the value of MAXPRIO is changed to priority of the process 808. Whether or not the particular process is of the highest priority, the bandwidth of the process is added to ALLOCATED 810. The iteration continues until the last process has been counted 812.

The variables ALLOWED and USED are determined, and ALLOCATED and AVAILABLE are calculated 820. When unauthorized bandwidth users at the node are using bandwidth, the AVAILABLE bandwidth is reduced.

If AVAILABLE is less than or equal to zero, then no bandwidth remains to allocate, and UpdateAllocations ends 861. If bandwidth remains, however, then AVAILABLE is set to the maximum of AVAILABLE and ALLOWED 862.

UpdateAllocations then assigns minimum bandwidth to the processes having the highest priority. Starting at the highest priority 822, UpdateAllocations identifies all the processes (starting with the first 824 ) having the highest priority and allocates to each the minimum bandwidth requested by the process 826. A running total AVAILABLE is reduced 828 by the bandwidth so allocated, the variable storing the total amount of bandwidth that can be assigned within the limit imposed by the administrator. Each process at the given priority is assigned bandwidth so long as AVAILABLE is not zero 830, and then UpdateAllocations turns to the next-highest priority, etc. until each process has at least the minimum requested by the process. If possible, UpdateAllocations give at least the minimum bandwidth to each process.

The number of applications that have received their minimum, is labeled the CONSUMERS. If there are consumers (i.e., applications that could receive an additional bandwidth allocation without exceeding their maximum) and bandwidth is available 832, then a quota is defined 834. The quota represents a small portion of bandwidth than can be reassigned. Starting at the first process that has received less than the maximum bandwidth requested (i.e., the first consumer) 836, UpdateAllocations proceeds through each process giving the process more bandwidth. Repeatedly, so long as there are any processes that have received less then the stated maximum thereof and so long as there is unallocated bandwidth remaining, UpdateAllocations divides the total remaining bandwidth by the number of processes have received less then their maximum, and attempts to allocate to each process the pro-rate share of the remaining bandwidth up to the maximum for the process, until either all processes have received their maximum or all bandwidth is exhausted. ALLOCATED 840, CONSUMERS 842, AVAILABLE 844, and the QUOTA 846 vary, but provide allocation of the bandwidth among the other applications. The application is then informed of its new allocation. Although in this embodiment of the present invention, the class of applications selected for allocation by the administrator is the class called "conferencing applications," it will be apparent that other applications could have been selected. It will be apparent that the group of applications, or even other types of processes, could have been selected. All of these values are all stored in the table, and are all provided to UpdateValues as well as the network.

UpdateAllocations may be implemented by the following code:

```
UpdateAllocations(
    UniversalBitsPtr                ub
){
    BlobalsPtr       gp;
    ProcessStuffPtr
ps;
    long             allocated, available, quota;
    short            prio, maxprio, consumers;
    allocated = 0;
    maxprio = 0;
    for(ps = (ProcessStuffPtr) ub->processes.qHead; ps; ps =
(ProcessStuffPtr) ps->qLink)
        for(gp = (GlobalsPtr ps->instances.qHead; gp; gp =
(GlobalsPtr) gp->qLink) {
                        if(gp->customer != TcFlower)
                                        continue;
                        if(gp->priority > maxprio)
                                        maxprio = gp-
>priority;
                        allocated +=gp ->allocated;
                        gp->allocated = 0;
        }
    consumers = 0;
    available = ub->allowed + (allocated - ub->used);
    if(available <= 0)
        return;
    if(available > ub->allowed)
        available = ub->allowed;
    for(prio = maxprio; maxprio = 0, prio; prio = maxprio)
        for(ps = (ProcessStuffPtr) ub-> process.qHead; ps;
ps = (ProcessStuffPtr) sp->qLink)
                        for(gp = (GlobalsPtr) ps-
>instances.qHead; gp; gp = (GlobalsPtr) gp->qLink)
        {
                        if(gp-priority == prio){
                                        if(available >= gp-'
>minRequested) {
                                                                 gp-
>allocated = gp->minRequested;
available -= gp->minRequested;
consumers++;
if(available == 0)
return;
                        }
                        }else if(gp->priority > maxprio)
                                        maxprio = gp-
>priority;
        }
    while(consumers > 0) {
        quota = available / consumers;
        if(quota == 0)
                        return;
        for(ps = (ProcessStuffPtr) ub->processes.qHead; ps;
```

-continued

UpdateAllocations may be implemented by the following code:

```
ps = (ProcessStuffPtr) sp->qLink)
                    for(gp = (GlobalsPtr) ps-
>instances.qHead; gp; gp = (GlobalsPtr) gp->Link) {
                        if (!gp->allocated)
                                        continue;
                        if((gp->allocated + quota)
>=gp->maxRequested) {
                                        consumers--;
                                        available -=
(gp->maxRequested - gp->allocated) ;
                                                gp-
>allocated = gp->maxRequested;
                        }else{
                                        available -=
quota;
                                                gp-
>allocated += quota;
                        }
            if(available == 0)
                                        return;
                }
        }
}
```

Although not absolutely necessary for operation, several embodiments of the present invention also includes a routine BlueDotQueryHappiness. As implemented according to one embodiment of the present invention, BlueDotQueryHappinessis shown in FIG. 9. The routine BlueDotQueryHappiness monitors how the bandwidth allocated to any given node is being parceled out among the conferencing applications and can also provide a visual indicator of how the available bandwidth is being parceled out. This is accomplished by calculating, in some embodiments, a "happiness" factor for each application, and in some embodiments also calculating a global happiness factor for each machine. The happiness factor can be visually presented to a user so the user can see the amount of bandwidth assigned within the machine to each application.

To calculate the happiness factor, the process compares the current bandwidth being allocated to the process for conferencing functions with the maximum bandwidth requested, and determines a first ratio. Thus, at each workstation or node, an "application happiness" factor corresponding to each application may be calculated, indicating how much of the bandwidth desired by the application is available to the application. As stated above, although in this embodiment of the present invention the administrator assigns a maximum bandwidth for conferencing applications, it will be apparent that any group of applications, or even a group of other types of processes, could have been selected.

In one embodiment, a visual embodiment of the happiness indicator is presented as a red dot when the corresponding happiness factor is 0 percent, a purple dot when the corresponding happiness factor is between 0 and 100 percent, and a blue dot when the corresponding happiness factor is 100 percent. The happiness factors may be displayed as colored dots on the screen of a monitor or connected to the machine. If the maximum bandwidth allocated to the machine by the administrator is greater than the total of all the maximums over all the processes trying to send data to the network, then all the processes are able to send data at their full data rate (bandwidth) and the "happiness" is 100%.

BlueDotQueryHappiness otherwise iterates through all the connections used by the application and assigns a score to each, the score being 50 points plus half the percentage of the difference between maximum and minimum that the process can use. If the amount allocated is less than the minimum, then the score is set to zero. The amount that the process can use is determined in UpdateAllocations, described below. If the amount allocated is equal to the minimum, then the happiness score is 50%, if the amount allocated is less than the minimum, then the happiness score is 0%, and if the amount allocated is equal to the maximum (or greater), then the allocation is set to the maximum requested and the happiness score is 100%.

BlueDotQueryHappiness provides information to the applications. As illustrated with respect to updateValues, Blue Dot includes subroutines that operate across applications, and each application provides information to Blue Dot; as illustrated with respect to BlueDotGimmeBandwidth, this information includes a maximum bandwidth request for each network process serving a conferencing application.

The average of all the scores is the happiness factor, as illustrated in one implementation by the following code:

```
__BlueDotQueryHappiness(
        GlobalsHandle           gh
){
        GlobalsPtr                              gx = *gh;
        GlobalsPtr                              gp;
        UniversalBitsPtr        ub;
        ProcessStuffPtr                         ps;
        int     count, score;
        gx->customer = TcApplication;
        ub = gx->process->universals;
        count = 0;
        score = 0;
            for(gp = (GlobalsPtr) ps->processes->instances.qHead; gp; gp =
(GlobalsPtr) gp->qLink)
                    if(gp->customer == TcFlower){
                        count++;
                        if(gp->allocated >= gp->minRequested)
                                score += 50 + (50 * (gp->allocated -
gp->minRequested)) / (gp- >maxRequested - gp->minRequested);
                    }
        return(count ? score / count : 100);
}
```

A happiness color may be assigned, such that the color is red when the happiness factor is less than 0%, blue when the happiness factor is 100%, and purple when the happiness factor is between 0% and 100%.

The described embodiment of the present invention cannot force other applications to use less bandwidth, but can provide feedback to the other applications by informing them that there is some interference among applications at the network interface. Thus, other applications may consult BlueDotQueryHappiness to determine whether data generated by a particular application is reaching the network, and, if not, whether the reason is because higher priority or other applications are usurping bandwidth allocation. In such an embodiment, the application can switch to a lower bandwidth use, turn on additional data compression, send fewer frames, or otherwise reduce bandwidth use to allow other applications to proceed more efficiently, or in the alternative may increase bandwidth demand to gain greater access to the network. Depending on the particular application, window size might be reduced, sound may be less complex, or additional users seeking access to the teleconference may be rejected.

During a teleconference, additional users may enter the teleconference and thereby increase the fan out. The low level flow control process detects the additional fan out, and provides the fan out update to BlueDotQueryHappiness. BlueDotQueryHappiness then updates the table maintained by the blue dot process. Because multi-cast may not be available or may not be supported by currently installed protocols or by rather hardware, additional users can change the bandwidth demand of a process.

Other house-keeping matters may be accounted for by the following code:

```
_BlueDotOpen(
    Handle          gh,
    ComponentInstance   self
){
    GlobalsPtr
    UniversalBitsPtr        ub;
    ProcessStuffPtr             ps;
    Boolean         same;
    ProcessSerialNumber             psn;
    GlobalWorld     saved;
    OSErr           err;
    ub = (UniversalBitsPtr) GetComponentRefcon((Component) self)
    if(!ub){
        if(!(ub = (UniversalBitsPtr)
NewPtrSysClear(sizeof(UniversalBits))))
                return(MemError());
        saved = GetCurrentGlobalWorld();
        err = InitCodeResource();
        if(!err)
                err = InitLibraryManager(0, kSystemZone,
kNormalMemory);
        if(!err)
                if(!IsFunctionSetLoaded((TFunctionSetID)
kBlueDotFunctions)){
                        err = kASLMCodeNotLoadedErr;
                        CleanupLibraryManager();
                }
        SetCurrentGloblaWorld(saved);
        if(err)
                ub->hacker = true;
        SetComponentRefcon((Component) self, (long) ub);
    }
    GetCurrentProcess(&psn);
    for(ps = (ProcessStuffPtr) ub->processes.qHead; ps; ps =
(ProcessStuffPtr)
ps->qLink)
        if(SameProcess(&psn, &ps->psn, &same) == noErr && same)
                break;
        if(!ps){
            if(!(ps = (ProcessStuffPtr)
            NewPtrSysClear(sizeof(ProcessStuff))))
                    return(MemError());
            ps->psn = psn;
            ps->universals = ub;
            Enqueue((QElemPtr) ps, &ub->processes;
        }
        if(!(gh = NewHandleClear(sizeof(Globals))))
                return(MemError());
        HLockHi (gh);
        gp = *(GlobalsHandle) gh;
        SetComponentInstanceStorage(self, gh);
        gp->self = self;
        gp->process = ps;
        Enqueue((QElemPtr) gh, &ps->instances);
        UpdateValues(ub);
        return(noErr)
}
    pascal ComponentResult
_BlueDotClose(
    GlobalsHandle           gh,
    ComponentInstance   self
){
    GlobalsPtr      gp;
    UniversalBitsPtr        ub;
    ProcessStuffPtr             ps;
    if(!gh)
        return(noErr) ;
    gp = *gh;
    ps = gp->process;
    Dequeue((QElemPtr) gp, &ps->instances);
    DisposeHandle((Handle) gh);
    ub = ps->universals;
    UpdateValues(ub);
```

```
-continued if(ps->instances.qHead)
        return(noErr) ;
    Dequeue(QElemptr) sp, &ub->processes);
    DisposePtr((ptr) ps);
    UpdateValues(ub);
    if(ub->processes.qHead)
        return(noErr);
    if(!ub->hacker) {
        EnterCodeResource() ;
        CleanupLibrary Manager() ;
        LeaveCodeResource() ;
    }
    SetComponentRefcon((Component) self, 0) ;
    DisposePtr((Ptr) ub);
    return(noErr) ;
}
```

The code set forth above in the description of one embodiment of the present invention can be stored in a main memory, a read only memory, or a mass storage device, or in other external storage devices such as magnetic discs or other magnetic media. FIGS. 10 shows such an embodiment of a main memory array containing a set of program instruction that, when executed by a processor of a computer system, performs steps according to one embodiment of the present invention. The steps stored in the memory array corresponding to FIG. 10 include steps to be performed at the client (non-administrator) node. The steps stored in the memory array corresponding to FIG. 11, however, include steps to be performed at the administrator node. It will be apparent that other means for storing programs are available, and that some systems provide several different sources of stored programs to the same processor. For example, application-level programs may be stored in main-memory or on a magnetic disc, while lower layer programs may be stored in a special cache or in ROM.

We claim:

1. In a computer network comprising nodes, a method of administering sending of teleconference data over the network comprising:

determining an allocated bandwidth corresponding to the sending;

communicating the allocated bandwidth to the nodes;

inhibiting use of bandwidth by any of the nodes in excess of the allocated bandwidth;

monitoring at least one nodal happiness factor;

adjusting the allocated bandwidth in response to the at least one nodal happiness factor;

dynamically measuring bandwidth use of program elements at a node; and assigning bandwidth among program elements, such that the total of assigned bandwidth is not greater than said allocated bandwidth.

2. The method of claim 1, further comprising:

determining for each program element at each node a desired bandwidth, the desired bandwidth being a total minimum bandwidth at which all program elements have sufficient bandwidth to operate at maximum speed; and determining for each program element a happiness factor, the happiness factor being proportional to the assigned bandwidth and inversely proportional to the desired bandwidth.

3. In a computer network comprising nodes, a system configured to administer at least one teleconference over the computer network, the system comprising:

a means for determining an allocated bandwidth corresponding to the at least one teleconference;

a means for communicating the allocated bandwidth to the nodes; and a means for inhibiting use of bandwidth by any of the nodes in excess of the allocated bandwidth;

a means for monitoring at least one nodal happiness factor;

a means for adjusting the allocated bandwidth in response to the at least one nodal happiness factor;

a means for dynamically measuring bandwidth use of program elements at a node; and a means for assigning bandwidth among program elements, such that the total of assigned bandwidth is not greater than the allocated bandwidth.

4. The system of claim 3, further comprising:

a means for determining a desired bandwidth for each program element at each node, the desired bandwidth being a total minimum bandwidth at which all program elements have sufficient bandwidth to operate at maximum speed; and a means for determining a happiness factor for each program element, the happiness factor being proportional to the assigned bandwidth and inversely proportional to the desired bandwidth.

* * * * *